United States Patent Office 3,232,921
Patented Feb. 1, 1966

3,232,921
PROCESS FOR THE POLYMERIZATION OF ETHYLENICALLY UNSATURATED COMPOUNDS IN THE PRESENCE OF BRANCHED CHAIN DIACYL PEROXIDE CATALYSTS
James E. Guillet, Kingsport, Tenn., assignor to Eastman Kodak Company, Rochester, N.Y., a corporation of New Jersey
No Drawing. Filed Aug. 29, 1961, Ser. No. 134,584
9 Claims. (Cl. 260—94.9)

This invention relates to the polymerization of ethylenically unsaturated polymerizable compounds and particularly to novel catalysts useful for this purpose. In a specific aspect, this invention relates to novel branched chain diacyl peroxides and their use as catalysts in the polymerization of ethylenically unsaturated polymerizable compounds.

It is known that ethylenically unsaturated compounds, and particularly ethylene, can be polymerized at temperatures in the range of about 40° to about 400° C. at atmosperic or higher pressures, for example, 10,000 p.s.i. or higher. Catalysts that have been suggested for use in these processes include oxygen, per-salts, diacyl peroxides, metal alkyls and azo compounds. However, but for a few noteworthy exceptions, the diacyl peroxides that are employed as catalysts in the many varying polymerization reactions are deficient as wholly desirable polymerization catalysts. For example, polymerization of ethylene at temperatures in the range of about 180° to about 300° C. and pressures in the range of about 10,000 to about 30,000 p.s.i., generally yields low density polyethylene that is characterized by greater toughness and flexibility than higher density polyethylene and, at temperatures in this range in a continuous process, diacyl peroxides such as acetyl peroxide, n-butyryl peroxide and propionyl peroxide have been used as catalysts. However, these lower straight chain acid peroxides are sensitive to shock and present hazards in manufacturing and handling. In order to reduce the shock sensitivity of the catalysts, peroxides of the higher straight chain acids, e.g., lauroyl peroxide or myristoyl peroxide, have been employed. However, these higher straight chain diacyl peroxides are solids at room temperature and are only very slightly soluble in the hydrocarbon solvents used for introducing the catalyst to the reactor. If the solvent is heated to dissolve the catalyst, the later will decompose with the result that its efficiency is impaired. Furthermore, a relatively high concentration of undesirable decomposition products such as lauric acid are introduced into the polymer formed. Acids such as lauric acid have a relatively strong odor and, therefore, impart an objectional odor to the resulting polymer.

It is evident that the state of the art will be greatly enhanced by providng novel diacyl peroxide catalysts that can be substituted for conventional prior art diacyl peroxide catalysts in polymerization processes but which are not subject to the deficiencies outlined hereinbefore. Likewise, a noteworthy contribution to the art will be a method for the polymerization of ethylenically unsaturated compounds employing such catalysts.

Accordingly, it is an object of this invention to provide novel diacyl peroxide catalysts that are effective to polymerize ethylenically unsaturated polymerizable compounds.

Another object of this invention is to provide novel diacyl peroxide catalysts that can be used to polymerize ethylenically unsaturated compounds, and particularly ethylene, over the same temperature range as straight chain diacyl peroxides such as acetyl, butyryl or lauroyl peroxide while, at the same time, exhibiting an improved solubility in hydrocarbon solvents over the straight chain diacyl peroxides.

Still another object of this invention is to provide novel diacyl peroxides that can be safely handled in commercial practice.

Other objects of this invention will become apparent upon an examination and consideration of the specification and claims that follow.

In accordance with this invention, it has been found that ethylenically unsaturated polymerizable compounds, and particularly ethylene, can be polymerized at temperatures in the range of about 80° to about 260° C. and at pressures in the range of about atmospheric pressure to about 50,000 p.s.i. in the presence of novel diacyl peroxides having the formula:

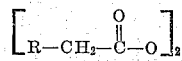

where R is a branched chain aliphatic hydrocarbon radical containing 3–20 carbon atoms.

A significant feature of this invention is that the novel peroxides employed as catalysts are insensitive to shock which allows them to be safely handled in commercial practice. Thus, it is known that most organic peroxides are potentially hazardous chemicals because of their sensitivity to heat. If proper temperature controls are used, many of them can be handled in industry without serious danger. However, certain types of peroxides are also sensitive to shock which can cause them to detanate in pumps or other equipment even though maintained at a low temperature. Compounds of this type cause special hazards which make them undesirable for many commercial uses. In order to test sensitivity to shock, on a laboratory scale, small samples are subjected to impact by a dropping weight. The amount of gas given off by the sample is measured and used to determine the amount of decomposition. The sensitivity of the compound can be determined either by the height required to cause the compound to decompose or by the dilution required to make it insensitive to the impact of the weight dropped from the maximum height available with the instrument. When subjected to this test, the peroxides of this invention are found to be sensitive to shock and thus eminently suitable catalysts for the polymerization of ethylenically unsaturated compounds on a commercial scale.

A convenient method for preparing the novel peroxides of this invention comprises reacting an acyl halide of the formula:

where R is as defined hereinbefore and X is halogen, for example, chlorine or bromine with an inorganic peroxide such as an alkali or alkaline earth metal peroxide, for example, sodium, calcium, or barium peroxide at a relatively low temperature in the range of about −40° to about 15 C° and more preferably in the range of about 0° to about 5° C. The halides can be obtained by converting the corresponding acid to its halide using any of the well known prior art techniques. It is also possible to employ the acid anhydride rather than the halide in this reaction, as shown in the following example. The reaction mixture can be allowed to rise to temperatures up to 25° C., for example, but, as a precautionary measure, temperatures in excess of 25° C. are to be avoided.

In a preferred mode of preparing the peroxides of this invention, an ether solution of the acyl halide is added gradually, as for example, dropwise, at a temperature in the range hereinbefore disclosed, to an aqueous solution or slurry of the alkali or alkaline earth metal peroxide. The reaction is continued to completion which is usually a period of not more than 5 hours after mixing the reactants. The resulting peroxide is characterized by a melting point below 0° C. and is soluble to an extent of at least 50% in hydrocarbon solvents such as benzene, heptane, iso-octane, and the like, at 25° C. Branched chain diacyl peroxides that can be prepared by the aforementioned procedure are employed as catalysts according to this invention include, for example, bis(3,5,5-trimethyl hexanoyl)peroxide, bis(4-ethyl-6-methyl heptanoyl)peroxide, bis(4-methyl pentanoyl)peroxide, and bis(3-cyclohexyl butyryl)peroxide.

Other reaction media besides water, for example, water soluble alcohols, such as ethanol and methanol or mixtures of water with these alcohols can be employed to dissolve the organic peroxide. Best results are, in general, obtained with water alone. The amount of water employed is subject to wide variation. Twenty to one hundred parts of water per part of alkali metal peroxide usually give satisfactory results. Any of the conventional aliphatic, cycloaliphatic or aromatic solvents can be used as the solvent for the acyl halide employed in the reaction. Suitable solvents for this purpose include, for example, ether, benzene, toluene, heptane and the like.

The temperature employed in the polymerization reaction is subject to wide variation and depends upon such variable factors as the monomer employed, the duration of heating, the pressure employed, the type of product desired and the type of process, for example, continuous or batch. However, in general, the catalysts of our invention can be used over a temperature range of about 80° to about 260° C. In batch polymerizations, where the contact time is generally 1 hour or more, temperatures of at least 80° C. and generally in the range of about 90° to about 160° C. will give satisfactory results. Temperatures in the range of about 180° to about 250° C., or even up to about 260° C., are generally employed in a continuous process where the contact time is of the order of 2 to 10 minutes.

The pressure employed in the polymerization, if any, is also subject to wide variation and can be any of the conventional pressures employed in such processes. The pressures used will depend to a large extent upon the molecular weight of the polymer desired and, for ethylene will generally be in the range of about 10,000 to about 50,000 p.s.i. and preferably in the range of about 10,000 to about 30,000 p.s.i. with pressures as low as 500 p.s.i. being effective, particularly where the product desired is a polyethylene wax. Where ethylenically unsaturated polymerizable compounds other than ethylene, e.g., styrene, methyl methacrylate, acrylonitrile, vinyl chloride and the like, are polymerized, the reaction proceeds very well at atmospheric pressure. The polymerization reaction is carried out in the presence of from 5 parts per million to 5%, by weight, of catalyst, based on the monomer to be polymerized, with catalyst concentrations of 10 to 10,000 parts per million being preferred in the case of ethylene. It is also possible to employ chain transfer agents, as exemplified by hydrogen, propane, chlorinated hydrocarbons or mercaptans, in the process of this invention.

The novel catalysts of this invention are extremely versatile and can be employed in the polymerization of any one or mixtures of ethylenically unsaturated polymerizable compounds containing at least one $CH_2=C<$ group and particularly those containing a $CH_2=CH-$ group. These catalysts are particularly suited to the polymerization of monoethylenically unsaturated polymerizable compounds containing 2–10 carbon atoms or mixtures thereof. Suitable polymerizable compounds included within the scope of this invention, therefore, include, ethylene, propylene, butene, decene, styrene, acrylic acid, methyl methacrylate, methyl acrylate, vinyl chloride, vinylidene chloride, butadiene, isoprene and the like.

This invention can be further illustrated by the following examples of preferred embodiments thereof although it will be understood that these examples are included merely for purposes of illustration and are not intended to limit the scope of the invention unless otherwise specifically indicated.

*Example 1*

As already indicated, the novel branched chain diacyl peroxides of this invention can be prepared by reacting the corresponding acyl halide with an inorganic peroxide at a relatively low temperature. The resulting peroxide is an extremely effective catalyst for the polymerization of ethylenically unsaturated compounds, and particularly ethylene. To illustrate, bis(3,5,5-trimethyl hexanoyl)peroxide is prepared by adding 1 g. of sodium peroxide to 10 cc. of water at 0° C. and slowly adding an ether solution (10 cc.) of 2.2 g. of 3,5,5-trimethyl hexanoyl chloride. The solution is kept cold and after 5 min. 1 g. of sodium peroxide is added with more ice and ethyl ether. The reaction is allowed to proceed for 15 minutes and the resulting mixture is then diluted with 50 ml. of cold ethyl ether. The ether layer is separated from the water layer by washing three times with ice cold water and drying over calcium chloride. The yield of peroxide is 65%, based on the amount of iodine liberated from an aliquoit of this solution.

As shown by infrared analysis, the solution contains primarily bis(3,5,5-trimethyl hexanoyl)peroxide (carbonyl absorption at 1818 and 1785 cm.$^{-1}$). The solution liberates free iodine from an acidified anhydrous sodium iodide solution. At 0° C. the peroxide is liquid and is miscible with hydrocarbon solvents. Drop weight tests on the pure liquid indicates that it is insensitive to shock. The half life of bis(3,5,5-trimethyl hexanoyl)peroxide in a 1% solution in toluene is 59.5 min. at 79° C.

To illustrate the very desirable results obtained using the novel peroxides of this invention as polymerization catalysts; 1 ml. of a solution of bis(3,5,5-trimethyl hexanoyl)peroxide containing 5 mg. of peroxide is placed in a high pressure autoclave. The autoclave is sealed, purged with oxygen-free ethylene and pressured to 20,000 p.s.i. of ethylene at 140° C. The reaction is continued for two hours after which the autoclave is cooled and vented. 3.85 g. of solid, white polyethylene is prepared in this manner.

*Example 2*

As pointed out hereinbefore, the branched chain diacyl peroxides of this invention can be prepared from the anhydride rather than the halide. To illustrate, 6.6 g. of 4-ethyl-6-methyl heptanoic anhydride (10° C.) is added slowly to a mixture of 1.56 g. of sodium peroxide in 30 ml. of toluene at 10° C. The reaction is allowed to continue for 4½ hours, the reaction mixture washed three times with ice cold water, and the toluene layer dried over calcium chloride. The toluene solution contains primarily bis(4-ethyl-6-methyl heptanoyl)peroxide as shown by infrared analysis (carbonyl absorption at 1762 and 1788 cm.$^{-1}$), and the liberation of iodine from an acidified anhydrous solution of sodium iodide. Based on the amount of iodine liberated, the yield of peroxide is 60%. This peroxide is a liquid at 0° C. and is miscible with hydrocarbon solvents. It is insensitive to shock in the drop weight tester and has a half life in a 1% toluene solution of 116 min. at 70° C.

The aforementioned properties make bis(4-ethyl-6-methyl heptanoyl)peroxide an excellent polymerization catalyst. Thus, 1 ml. of a solution containing 15 mg. of bis(4-ethyl-6-methyl heptanoyl)peroxide is placed in a high pressure autoclave. The autoclave is sealed, purged with oxygen-free ethylene and pressured to 20,000 p.s.i. of ethylene at 100° C. The reaction conditions are maintained for two hours after which the autoclave is cooled and vented. 8.72 g. of solid, white polyethylene is prepared using this procedure.

Example 3

Bis(4-methyl pentanoyl)peroxide is prepared by the reaction of 4-methyl pentanoyl chloride with sodium peroxide according to the procedure of Example 1. The yield of peroxide is 89% and, on evaporation of a portion of the ether solution, an oily liquid is obtained which is insensitive to shock in the drop weight test. An analysis of the product by reaction with sodium iodide indicates that the liquid contains 93% 4-methyl pentanoyl peroxide, and an infrared spectrum of the sample shows carbonyl absorption bands of 1818 and 1785 cm.$^{-1}$. The peroxide is miscible in all portions with benzene, hexane and toluene. This branched chain peroxide is an effective polymerization catalyst, as illustrated in Example 5 which follows.

Example 4

Bis(3-cyclohexyl butyryl)peroxide is prepared by reaction of 3-cyclohexyl butyryl chloride with sodium peroxide according to the procedure of Example 1. The yield of peroxide is 64% and on evaporation of a portion of the ether solution, an oily liquid is obtained which is insensitive to shock and infrared absorption spectrum of the sample shows the characteristic carbonyl absorption bands of 1818 and 1785 cm.$^{-1}$. The peroxide is miscible with hexane and toluene and is an effective catalyst in the polymerization of polymerizable ethylenically unsaturated compounds, as illustrated by Example 5 which follows.

Example 5

The novel peroxides of our invention are very versatile and, therefore, can be used in the polymerization of non-hydrocarbon ethylenically unsaturated polymerizable compounds as well as those that are hydrocarbons. To illustrate this aspect of the invention, a number of the branched chain diacyl peroxides of this invention are employed to catalyze the polymerization of styrene, methyl methacrylate and vinyl acetate using the procedure set forth below. For comparative purposes, a conventional prior art catalyst, i.e., lauroyl peroxide, is employed as the catalyst using the same procedure, as follows:

1 g. of the peroxide is placed in a glass vial with 20 g. of purified monomer. The vial is flushed with nitrogen and sealed. The vials are heated to 80° C. in a water bath for six hours. The vials are then cooled to room temperature, opened and the polymer isolated by dissolving in a suitable solvent and precipitating with methanol. After drying in a circulating air oven, the polymer yields are determined by weighing. The results of these runs are set forth below.

| Catalyst | Yield of polymer, g. | | |
|---|---|---|---|
| | Styrene | Methyl methacrylate | Vinyl acetate |
| Lauroyl peroxide | 15.2 | 17.9 | 16.4 |
| Bis(3,5,5-trimethyl hexanoyl) peroxide | 18.4 | 19.3 | 17.7 |
| Bis(4-ethyl-6-methyl heptanoyl) peroxide | 19.2 | 19.5 | 18.3 |
| Bis(4-methyl pentanoyl) peroxide | 19.1 | 19.4 | 18.7 |
| Bis(3-cyclohexyl butyryl) peroxide | 18.7 | 18.9 | 17.9 |

By the practice of this invention there is provided a novel class of diacyl peroxides that can be used to catalyze the polymerization of ethylenically unsaturated polymerizable compounds and which are not subject to the deficiencies of prior art diacyl peroxides. Thus, the catalysts of this invention are effective for the polymerization of ethylenically unsaturated polymerizable compounds, and particularly ethylene, under the same temperature conditions as conventional straight chain diacyl peroxides such as acetyl, n-butyryl or lauroyl peroxide, but they exhibit improved solubility in hydrocarbon solvents over these conventional diacyl peroxides and are insensitive to shock.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. Bis(4-ethyl-6-methyl heptanoyl)peroxide.
2. Bis(4-methyl pentanoyl)peroxide.
3. Bis(3-cyclohexyl butyryl)peroxide.
4. A diacyl peroxide selected from the group consisting of bis(4-ethyl-6-methyl heptanoyl)peroxide, bis(4-methyl pentanoyl)peroxide and bis(3-cyclohexyl butyryl peroxide.
5. The process for the polymerization of an ethylenically unsaturated polymerizable compound containing a $CH_2=C<$ group which comprises polymerizing said compound at a pressure in the range of about atmospheric pressure to about 50,000 p.s.i. and a temperature in the range of about 80° C. to about 260° C. in the presence of a diacyl peroxide selected from the group consisting of bis(4-ethyl-6-methyl heptanoyl)peroxide, bis(4-methyl pentanoyl)peroxide and bis(3-cyclohexyl butyryl)peroxide.
6. The process of claim 5 where the diacyl peroxide is bis(4-ethyl-6-methyl heptanoyl)peroxide.
7. The process of claim 5 where the diacyl peroxide is bis(4-methyl pentanoyl)peroxide.
8. The process of claim 5 where the diacyl peroxide is bis(3-cyclohexyl butyryl)peroxide.
9. The process for the polymerization of ethylene which comprises polymerizing ethylene at a pressure in the range of about 10,000 to about 50,000 p.s.i. and a temperature in the range of about 80° C. to about 160° C. in the presence of bis(4-ethyl-6-methyl heptanoyl)peroxide as catalyst.

References Cited by the Examiner

UNITED STATES PATENTS

| 2,366,306 | 1/1945 | Alexander et al. | 260—87.5 |
| 2,858,326 | 10/1958 | Ashby | 260—453 |
| 2,865,904 | 12/1958 | Seed et al. | 260—453 |
| 3,019,214 | 1/1962 | Pajaczkowski | 260—94.9 |
| 3,108,093 | 10/1963 | Pajaczkowski et al. | 260—89.5 |

OTHER REFERENCES

Adams et al., Journal of Polymer Science, vol. IX, pages 481–492 (1952).

Silbert, Journal American Chemical Society, vol. 81, pages 2364–67 (1959).

JOSEPH L. SCHOFER, *Primary Examiner.*

H. N. BURSTEIN, W. H. SHORT, *Examiners.*